C. J. HUNTER.
SIDE CAR FOR MOTOR CYCLES.
APPLICATION FILED JAN. 15, 1915.

1,172,995.

Patented Feb. 22, 1916.
3 SHEETS—SHEET 1.

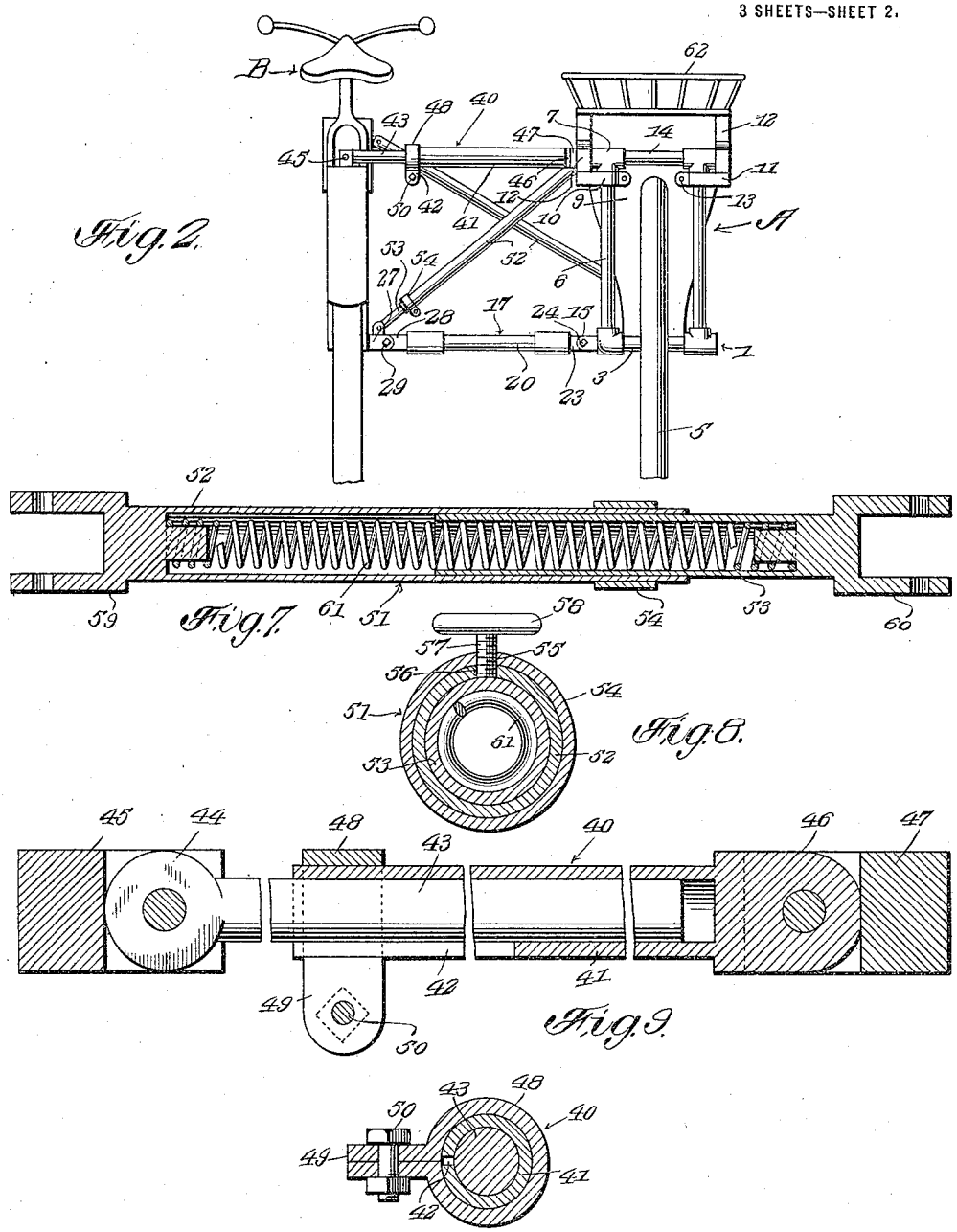

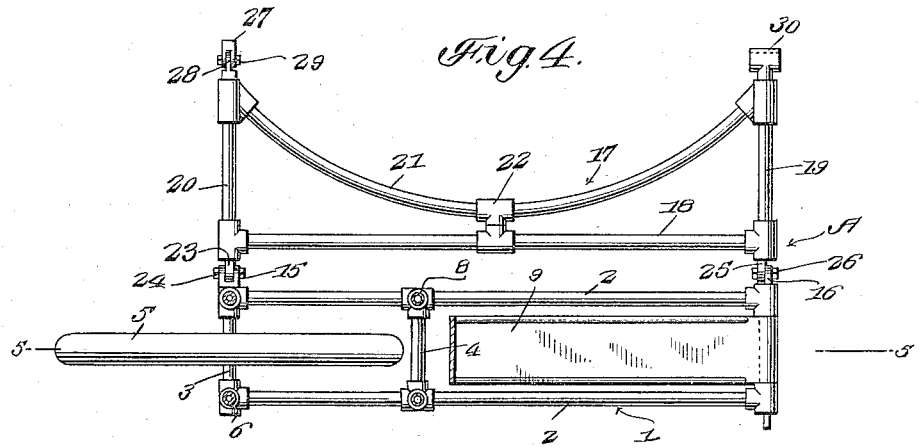

UNITED STATES PATENT OFFICE.

CHARLES J. HUNTER, OF NEWPORT NEWS, VIRGINIA.

SIDE CAR FOR MOTOR-CYCLES.

1,172,995.         Specification of Letters Patent.         Patented Feb. 22, 1916.

Application filed January 15, 1915. Serial No. 2,441.

*To all whom it may concern:*

Be it known that I, CHARLES J. HUNTER, a citizen of the United States of America, residing at Newport News, in the county of Warwick and State of Virginia, have invented new and useful Improvements in Side Cars for Motor-Cycles, of which the following is a specification.

This invention relates to improvements in side cars for motorcycles and is in the nature of an improvement upon Patent No. 1,063,864, issued June 3, 1913, to F. C. Edwards and myself.

In carrying out the present invention, it is my purpose to improve and simplify the general construction of side cars and to provide strong and durable connections between the side car and the motorcycle.

It is also my purpose to provide a side car whereby the rider will be comfortably and conveniently supported and to provide connections between the side car and the motorcycle which will be constructed in such manner as to enable relative vertical movement between the side car and the motorcycle, as when the motorcycle encounters an obstruction in the roadway and the side car drops into a depression, and whereby the side car and motorcycle may be connected rigidly together when conditions warrant.

With the above and other objects in view, the invention consists in the construction, combination and arrangement of parts hereinafter set forth in and falling within the scope of the claims.

Figure 1:
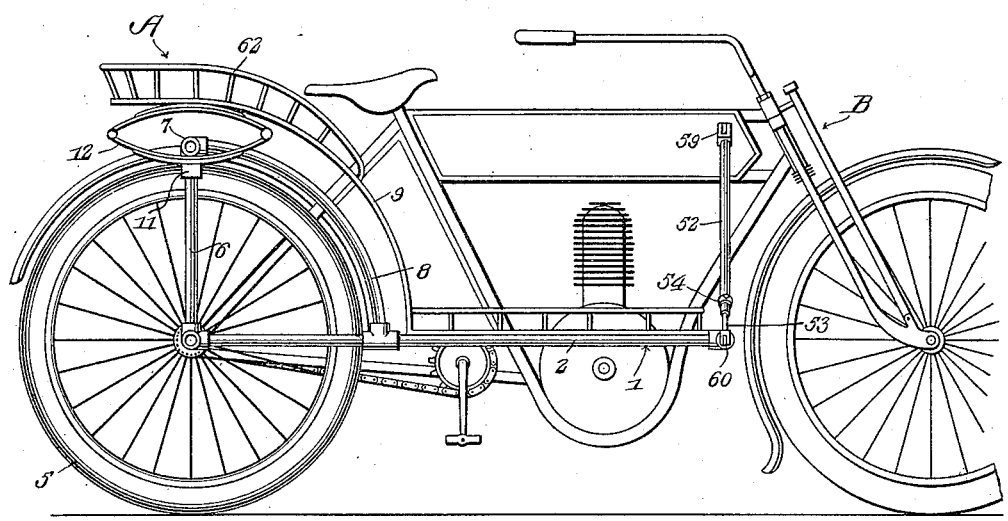
Figure 3:
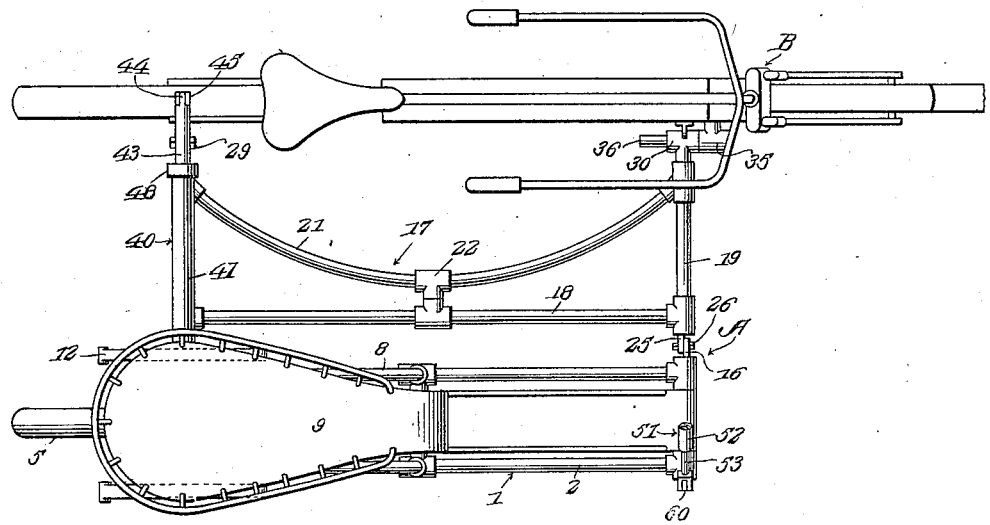

In the accompanying drawings: Figure 1 is a side elevation of a side car connected to a motorcycle. Fig. 2 is a view in rear elevation of the side car and motorcycle connected. Fig. 3 is a top plan view thereof. Fig. 4 is a horizontal sectional view through the side car showing a portion of the frame of the latter and the connection between the frame and the motorcycle in top plan. Fig. 5 is a longitudinal sectional view on the line 5—5 of Fig. 4. Fig. 6 is a plan view of the connecting brace at the forward end of the side car. Fig. 7 is a longitudinal sectional view through the telescopic diagonal brace. Fig. 8 is a transverse sectional view therethrough. Fig. 9 is a longitudinal sectional view through the telescopic horizontal brace. Fig. 10 is a cross sectional view therethrough.

Referring now to the drawings in detail, A designates a side car and B a motorcycle. The motorcycle B may be of any preferred or well known type, while the side car A comprises a substantially rectangular frame 1 embodying longitudinal side bars 2, 2 and transverse end bars 3, 3 and a central reinforcing bar 4 extending across the space between the longitudinal bars 2 and having the opposite ends thereof secured to such bars respectively. The side and end bars and the central reinforcing bar of the frame 1 are preferably composed of hollow tubing having the meeting ends thereof joined together by means of appropriate couplings. In the present instance, one of the end bars 3 forms an axle and rotatably mounted upon such end bar is a ground wheel 5, suitable anti-friction bearings being interposed between the end bar and the hub of the wheel so that the latter may revolve freely about the axle.

Suitably secured to the couplings connecting the axle forming end bar with the side bars 2 and uprising from such couplings are supporting posts 6 preferably formed of metal tubing and connected with the upper ends of the posts 6 through the medium of elbows 7 are the upper ends of quadrantal bars 8, the lower ends of such bar being connected with the side bars 2 through the medium of the couplings between the reinforcing bar 4 and such side bars. These quadrantal bars are formed of hollow metal tubes and constitute a rest for the seat of the side car and in this instance, the seat of the side car is formed of a single sheet of metal 9 having one end portion thereof bent to conform to the curvature of the quadrantal bars 8 and the remaining end portion lying upon the forward end portion of the side bars 2, 2 of the frame. The forward end of the metal plate 9 is coiled upon itself about the forward end bar 3 whereby the plate 9 may swing vertically relatively to the supporting frame and the rest. The upper end portion of the plate 9 is preferably enlarged as illustrated in Fig. 3 so as to form a comfortable seat. Surrounding the posts 6 respectively adjacent to the upper ends thereof and capable of vertical adjustment thereon are collars 10, 10 having the inner portions thereof formed with inwardly extending lugs 11 and interposed between the upper surfaces of the lugs 11 and the bottom of the seat are springs 12 acting to hold the seat portion of the plate out of engagement with the quadrantal bars 8 and serving to cushion the seat portion of the plate as the latter tends to swing about its pivotal connection with the forward end bar of the frame. These collars are held in the desired adjusted position by means of clamping bolts 13. In the present instance, a connecting bar 14 is disposed between the elbows 7 and has the opposite ends thereof suitably secured to such elbows respectively, such bar acting to brace the upper ends of the posts 6 and the similar ends of the bars 8 so as to impart stability and rigidity to the structure. By adjusting the collars 10 along the posts 6, the pressure of the springs 12 on the seat portion of the plate 9 may be varied.

In order to connect the side car A to the motorcycle B the following mechanism is employed: Formed on one side of the frame 1 adjacent to the axle or rear end thereof and projecting outwardly therefrom is a pivot knuckle 15, while formed on the frame at the opposite end thereof and projecting outwardly therefrom is a pivot lug 16. 17 designates a connecting frame comprising a longitudinal bar 18 formed of metal tubing, end bars 19, 20 formed of metal tubing and disposed at right angles to the bar 18 and having the ends thereof connected to the respective ends of the bar 18 through the medium of appropriate couplings. A segmental reinforcing bar 21 in the form of a hollow metal tube has the extremities thereof secured to the outer ends of the respective tubular bars 19 and 20 and the central portion thereof connected with the similar portions of the bar 18 through the medium of a connector 22. Formed on the extremity of the end bar 20 connected with the side bar 18 is a pivot lug 23 disposed within the knuckle 15 and formed with an opening alining with openings in the knuckle 15 and through these alining openings is passed a horizontal pivot bolt 24, while formed on the extremity of the end bar 19 connected with the bar 18 is a pivot lug 25 formed with a horizontal opening alining with a similar opening in the lug 16 and passed through these registering openings is a horizontal pivot bolt 26. Connected with the frame of the motorcycle at the rear end thereof and projecting outwardly therefrom is a pivot knuckle 27 and disposed within the pivot knuckle 27 is a lug 28 formed integral with the extremity of the end bar 20 remote from the side car and passed through the lug 28 and the pivot knuckle 27 is a horizontal pivot bolt 29, while connected to the extremity of the end bar 19 remote from the side car is a horizontally disposed sleeve 30 having the longitudinal axis thereof lying in a plane parallel with the longitudinal bar 18 of the connecting frame. Passed through a suitable bracket appropriately connected to the frame of the motorcycle approximately centrally thereof is a horizontal stud 31 projecting outwardly from the side of the frame carrying the pivot knuckle 27 and connected with the outer end of the stud 31 is an arm 32 disposed at right angles to the arm 31 and projecting toward the forward end of the motorcycle. Formed on the forward end of the arm 32 is a horizontal sleeve 33 having the longitudinal axis thereof disposed at right angles to the plane of the arm and adjustably mounted within the sleeve 33 is a horizontal tubular arm 34 disposed in a plane parallel with the stud 31 and having the outer end thereof projecting beyond the outer end of the arm 31 and equipped with a horizontally disposed sleeve 35 having the longitudinal axis thereof arranged at right angles to the arm 34. Fixed within the sleeve 35 is a rod 36 designed to enter the sleeve 30 and coöperate with the knuckle 27 to form a pivotal connection between the frame 17 and the motorcycle. When connecting the frame 17 with the motorcycle, the sleeve 30 is passed onto the bolt 36 and the lug 28 subsequently disposed within the knuckle 27 and connected with the latter by means of the pivot bolt 29. The pivot bolt 29 alines axially with the rod 36 so that the frame 17 may swing vertically relatively to the motorcycle when occasion demands. The arm 34 is adjusted within the sleeve 33 so as to bring the bolt 36 in alinement with the bolt 29 and locked in such adjusted position through any suitable means. In the present instance, the sleeve 33 is split longitudinally as at 37 and formed with outwardly projecting lugs 38 on the respective walls of the split portion, such lugs being formed with alining openings to receive a securing screw 39 whereby the sleeve may be clamped upon the arm 34 to hold the latter against longitudinal movement within the sleeve.

The frame 1 of the side car is preferably of a length slightly greater than one-half of the similar dimension of the motorcycle so that the pivot lug 28 and sleeve 30 will properly fit the knuckle 27 and bolt 36 respectively. The connecting frame 17, it will be noted, is pivotally connected with the motorcycle and likewise connected with the side car and all the pivot bolts disposed in a horizontal plane. Thus, the side car may move vertically relatively to the motorcycle and vice versa so that in the event of one vehicle encountering an obstruction in the roadway and the other vehicle dropping into a depression, such vehicles will have the necessary movement therebetween to accommodate the inequalities in the roadway.

The rear end of the side car A at the top thereof is connected with the similar end of the motorcycle adjacent to the seat on the latter so that the motorcycle and side car will possess stability and remain in vertical upright position. In the present instance, this connection is effected through the agency of a horizontal brace bar 40 comprising a tubular section 41 having one end open and split longitudinally for a portion of its length as at 42 at the open end thereof, and a solid section 43 having one end telescoping within the tubular section 41. On the outer end of the solid section 43 is a pivot knuckle 44 pivotally connected with a similar knuckle 45 secured to the frame of the motorcycle in proximity to the seat thereof, while formed on the outer end of the tubular section 41 is a pivot knuckle 46 pivotally connected with a similar knuckle 47 secured to the elbow connecting the inner post 6 and the adjacent quadrantal bar 8. Encircling the split end of the tubular section 41 is a split clamping collar 48 having the split ends thereof provided with outwardly extending lugs 49 respectively formed with alining openings to receive a securing bolt 50. In the use of the horizontal brace bar 40 the sections 41 and 43 are moved relatively to one another until the bar 40 has reached the necessary length, such length being commensurate with the width of the connecting frame 17. At this time, the clamping collar 48 is tightened by means of the bolt 50 so as to draw the split end of the tubular section 41 into engagement with the solid section 43, thereby locking the sections of the telescopic bar against relative movement. The pivot bolts of the knuckles 44 and 45 and 46 and 47 respectively are disposed in horizontal planes to correspond with the pivot points of the connecting frame 17 and the bar 40 coacts with the frame 17 to maintain the side car and motorcycle properly spaced apart and at the same time stabilize the two vehicles so that they may remain upright when at a standstill without the necessity of other supports.

In this embodiment of my invention, I employ a diagonal brace bar 51, such bar comprising an outer tubular section 52 and an inner tubular section 53 telescoping within the outer section 52 at one end of the latter. Surrounding the section 52 adjacent to the end receiving the section 53 is an annular collar 54 formed with a threaded opening 55 registering with an opening 56 in the section 52 and threaded into the opening 55 is a set screw 57 having the outer end thereof provided with a hand hold 58 whereby the set screw may be rotated to enter the opening 56 and engage the adjacent portion of the inner section 53 and so lock the sections 52 and 53 of the bar against longitudinal movement. Normally, however, the sections 52 and 53 are capable of relative longitudinal movement. Fast upon the outer end of the section 52 is a pivot knuckle 59, while secured to the outer end of the section 53 is a similar knuckle 60 and disposed within the sections 52 and 53 is a coiled compression spring 61 having one end in engagement with the outer end of the section 52 and the remaining extremity abutting the outer end of the section 53, such spring acting to hold the sections 52 and 53 normally distended. The pivot knuckle 59 is pivotally connected with a coöperating knuckle secured to the frame 1 of the side car adjacent to the upper end thereof, while the pivot knuckle 60 is connected with a companion knuckle carried by the adjacent side of the frame of the motorcycle in proximity to the motorcycle end of the connecting frame 17.

Under normal conditions, the sections 52 and 53 slide freely one upon the other and the compression spring 61 acts to prevent the too sudden swinging movement of the side car and motorcycle relatively to each other, the spring acting, in effect, as a shock absorber. When it is desired to render the sections 52 and 53 immovable relatively to each other the set screw 57 is actuated to engage the inner section 53, thereby locking the sections of the diagonal brace bar 51 against relative movement whereby a rigid connection is, in effect, formed between the side car and the motorcycle.

In the embodiment of my invention selected for illustrative purposes, a railing 62 is secured to the marginal edge of the seat portion of the plate 9 and projects outwardly and upwardly therefrom so that the occupant of the side car may be conveniently and comfortably seated.

From the foregoing description taken in connection with the accompanying drawings, the construction, mode of operation and manner of connecting my improved side car to a motorcycle will be readily apparent. It will be seen that I have provided a side car whereby the seat forming plate may move relatively to the frame as the vehicle travels along the road and wherein such movement will be cushioned, while the connections between the side car and the motor vehicle permit relative vertical movement between the two vehicles so that any inequalities in the roadway may be overcome without jarring or jolting the occupants of the vehicle.

While I have herein shown and described the preferred form of my invention by way of illustration, I wish it to be understood that I do not limit or confine myself to the precise details of construction herein described and delineated, as modification and variation may be made within the scope of the claims without departing from the spirit of the invention.

I claim:

1. A side car for motorcycles comprising a rectangular frame, posts upstanding from the side bars of said frame at one end thereof, quadrantal bars each having one end thereof secured to the upper extremity of one of said posts and the remaining end secured to the adjacent side bar approximately centrally of the latter, and a plate resting upon said frame and having one end portion thereof curved to conform to the curvature of said quadrantal bars and the remaining end portion disposed in a horizontal plane and resting upon the adjacent horizontal portion of said frame.

2. A side car for motorcycles comprising a rectangular frame, posts upstanding from the side bars of said frame at one end thereof, quadrantal bars each having one end thereof secured to the upper extremitiy of one of said posts and the remaining end secured to the adjacent side bar approximately centrally of the latter, a plate resting upon said frame and having one end portion thereof curved to conform to the curvature of said quadrantal bars and the remaining end portion disposed in a horizontal plane and resting upon the adjacent horizontal portion of said frame, a pivotal connection between one end of said plate and the last-mentioned end of said frame, and means yieldably supporting the curved end of said plate.

3. A side car for motorcycles comprising a rectangular frame, posts upstanding from the side bars of said frame at one end thereof, quadrantal bars each having one end thereof secured to the upper extremity of one of said posts and the remaining end secured to the adjacent side bar approximately centrally of the latter, a plate resting upon said frame and having one end portion thereof curved to conform to the curvature of said quadrantal bars and the remaining end portion disposed in a horizontal plane and resting upon the adjacent horizontal portion of said frame, a pivotal connection between one end of said plate and the last-mentioned end of said frame, springs supporting the curved end of said plate, and means for adjusting said springs.

4. A side car for motorcycles comprising a rectangular frame formed of hollow metal tubing, posts upstanding from the side bars of said frame at one end thereof and formed of hollow metal tubes, quadrantal bars each having one end thereof secured to the upper extremity of one of said posts and the remaining end secured to the adjacent side bar approximately centrally thereof and formed of hollow metal tubing, a reinforcing tubular bar connecting the side bars of said frame centrally of the latter, and a seat plate carried by said quadrantal bars.

5. A side car for motor cycles comprising a rectangular frame, posts upstanding from the side bars of said frame at one end thereof, quadrantal bars each having one end secured to the upper extremity of one of said posts and the remaining end secured to the adjacent side bar approximately centrally thereof, a reinforcing bar interconnecting the side bars of said frame and a seat plate carried by said quadrantal bars.

6. The combination with a motor cycle and side car of a connecting frame disposed between the side car and the motor cycle comprising a longitudinal bar, end bars disposed at right angles to said longitudinal bars and connected thereto and a segmental reinforcing bar having the extremities thereof secured to the outer ends of said end bars and the central portion secured to the corresponding portion of said longitudinal bar, pivot couplings connecting said frame to the frame of the motor cycle and pivot couplings connecting said frame to the frame of the side car whereby the side car and motor cycle may have relative movement.

In testimony whereof I affix my signature in presence of two witnesses.

CHARLES J. HUNTER.

Witnesses:
T. P. BARTLETT,
R. H. KOONTZ.

Copies of this patent may be obtained for five cents each, by addressing the "Commissioner of Patents, Washington, D. C."